(12) United States Patent
Southall

(10) Patent No.: US 6,322,693 B1
(45) Date of Patent: Nov. 27, 2001

(54) WASTE PROCESSING SYSTEM AND RELATED METHODS

(75) Inventor: Ricky Southall, Marrero, LA (US)

(73) Assignee: Sun Drilling Products Corporation, Belle Chasse, LA (US)

( * ) Notice: Subject to any disclaimer, the term of this patent is extended or adjusted under 35 U.S.C. 154(b) by 0 days.

(21) Appl. No.: 09/252,520

(22) Filed: Feb. 18, 1999

(51) Int. Cl.[7] ........................................... G21F 9/24
(52) U.S. Cl. ................. 210/85; 210/170; 210/259; 210/416.1; 405/128; 405/263; 588/17
(58) Field of Search .................. 210/747, 767, 210/85, 92, 170, 259, 416.1; 405/128, 263; 588/16, 17

(56) References Cited

U.S. PATENT DOCUMENTS

| | | | |
|---|---|---|---|
| 5,207,532 | * | 5/1993 | Mason et al. .................... 405/128 |
| 5,613,242 | * | 3/1997 | Oddo ............................... 405/128 |

* cited by examiner

Primary Examiner—Robert Popovics
(74) Attorney, Agent, or Firm—Daniel H. Golub

(57) ABSTRACT

A waste processing system comprising a mixing tank system with an agitation system; a separation system, and a slurry tank system having a shearing system. The present invention also relates to a method of processing waste which includes the steps of: (a) mixing waste with a carrier liquid, b) separating the mixture into at least two portions, the first portion being solid debris and the second portion being processable waste c) shearing and slurrifying the processable waste, and injecting the processed mixture into a wellbore.

22 Claims, 2 Drawing Sheets

WASTE PROCESSING SYSTEM AND RELATED METHODS

FIELD OF INVENTION

The present invention relates to a waste processing system comprising a first mixing tank system with an agitation system, a first separation system, a slurry tank system with a shearing system, a second separation system and a second mixing tank system with an agitation system. The present invention also relates to methods of processing waste.

BACKGROUND OF INVENTION

The disposal of waste such as drilling waste (e.g., cuttings, muds, reservoir pit, fluids, etc.) from drilling various types of wells has become an increasingly difficult problem due to restrictions imposed by various governmental authorities and agencies, and the desire to minimize environmental damage. These problems are aggravated or at least amplified in certain wellbore drilling operations, particularly in offshore drilling operations, wherein the disposal of wastes normally requires transport of the waste to a suitable landfill or shore-based processing system or an offsite commercial nonhazardous oilfield waste facility. Disposal of nonhazardous oilfield waste (NOW) can be disposed of by the above methods.

Another method of disposing of drilling waste is to dispose of such waste down a wellbore of a non-productive reservoir of an exploratory well. Drilling operators, regulators and government authorities are trying to determine whether the above method can be applied to injecting productive pit solids contaminated with naturally-occurring radioactive material (NORM) either alone or in combination with NOW, into non-productive reservoirs.

SUMMARY OF THE INVENTION

The present invention relates to a waste disposal system comprising at least one mixing tank system comprising at least one mixing tank having an agitation system situated within each of the mixing tanks, a first separation system having at least one separation device, at least one slurry tank system comprising at least one slurry tank having a shearing system situated within each of the slurry tanks, and a second separation system having at least one separation device. In one embodiment, the waste processing system further comprises a plurality of conduits for connecting the mixing tank system, the first separation system, the slurry tank system, and the second separation system. Conduits or flow conduits are a piping system that connect each component of the waste system to one another and is subsequently connected to an injection pump for injecting the processed waste into a wellbore.

In another embodiment, the mixing tank system can comprise at least one mixing tank having a jet line and a sampling system for testing the waste. The sampling system is a system that can be installed throughout different stages of the waste process system that enables the user to test samples of the processed waste in order to obtain a more controllable product.

In still another embodiment, the agitation system of the mixing tank system can comprise a gear box, at least one motor and a plurality of blades. In yet another embodiment, the first and second separation system comprises at least one separation device having at least one screen or a plurality of screens with varying screen mesh sizes. The screen mesh sizes are dependent upon the size of the particles of waste being processed. The separation devices include, but are not limited to, vibrating screens such as shale shakers.

In still a further embodiment, the slurry tank system can compromise at least one slurry tank having a shearing system situated within each of the slurry tanks. The shearing system can comprise a gear box, at least one motor, a plurality of blades, a shearing mixer, and gun lines. The slurry tanks can also have a manifold system. The manifold system is designed to re-circulate materials throughout the system so that a user can adjust the fluid and flow rates of the waste processing system of the present invention. For purposes of this invention, gun lines are mechanical agitators of the processed fluid and wastes traveling through the waste processing system.

In one embodiment, the system of the present invention further comprises a second slurry tank system connected to the second separation system. The second slurry tank system comprises at least one slurry tank having a shearing system situated with each of the tanks. The shearing system is similar to the shearing system of the first slurry tank system.

In another embodiment, the waste processing system of the present invention further comprises a second mixing tank system connected to the second separation system. The second mixing tank system comprises at least one mixing tank having an agitation system situated within each of the tanks. The agitation system is similar to the agitation system in the first mixing tank system. The agitation system of the present invention includes shearing devices and shearing systems.

In still another embodiment, the system of the present invention further comprises a pump system for pumping waste through the system. The pump system can comprise a plurality of injection pumps and centrifugal pumps. In still yet another embodiment, the mixing tank system may comprise at least one mixing pump and the slurry tank system may comprise at least one shearing pump.

In a further embodiment, the waste processing system further comprises at least one holding tank. The holding tank retains the processed waste until it is ready to be injected into the wellbore. In still another embodiment, the holding tank can be adapted to be transported to the injection site.

In another embodiment, the present invention relates to a waste processing system comprising: (a) a first mixing tank system comprising at least one mixing tank having a first agitation system situated within each of said mixing tanks, (b) a first separation system comprising at least one separation device and being connected to the first mixing tank system, (c) a slurry tank system comprising at least two slurry tanks having a shearing system situated within each of the slurry tanks, the slurry tank system being connected to the first shale shaker system; (d) a second separation system comprising at least two separation devices and being connected to the slurry tank system; and (e) a second mixing tank system comprising at least two mixing tanks, each of the tanks having a second agitation system within the tanks, the second mixing tank system being connected to the second separation system.

In a further embodiment, the first and second mixing tank systems can comprise at least one mixing tank having a jet line. The second mixing tank system can comprise at least one mixing tank having a sampling system for testing the waste. The sampling system can be installed throughout the different stages of the waste processing system. The sampling system enables the user to obtain test samples of the processed waste product.

In yet another embodiment, the first and second agitation systems of the first and second mixing tank systems comprise a gear box, at least one motor and a plurality of blades. In still yet another embodiment, the first and second separation system comprises at least one separation device having at least one screen or a plurality of screens with varying screen mesh sizes. The screen mesh sizes is dependent on the size of the waste particles being processed. The separation device can include, but is not limited to, vibrating screens such as shale shakers. In yet a further embodiment, the slurry tank system can comprise at least one slurry tank wherein a shearing system is situated. The shearing system of the slurry tank system can comprise a gear box, at least one motor, a plurality of blades, a shearing mixer, and gun lines.

In one embodiment, the waste processing system further comprises a plurality of conduits for connecting the first mixing tank system, the first separation system, the slurry tank system, the second separation system and the second mixing tank system.

In another embodiment, the system of the present invention can comprise a pump system from pumping waste through the waste processing system. The pump system can comprise a plurality of injection pumps and centrifugal pumps. The pump system is capable of pumping a certain liquid though the system. The pump system may also comprise at least one pump having impellers for shearing the waste. The mixing tank system may have a mixing pump and the slurry tank system may have a shearing pump.

In still another embodiment, the waste processing system can further comprise a holding tank for retaining the processed waste. The holding tank can be connected to the second mixing tank system.

In yet another embodiment, the waste processing system of the present invention comprises a wellbore wherein the processed waste is injected.

In a further embodiment, the present invention relates to a method of processing waste which comprise the steps of: (a) providing a first mixing tank comprising at least one mixing tank having an agitation system situated within the tank, a first separation system comprising at least one separation device and at least one slurry tank system comprising at least one slurry tank having a shearing system situated within the tank; (b) mixing waste and carrier liquid in the first mixing tank system using the agitation system; (c) separating the mixture using the first separation system into at least two portions, a first portion being solid debris and a second portion being processable waste; and (d) shearing the processable waste using the shearing system of the slurry tank and slurrifying the processable waste using the slurry tank system. The solid debris includes rocks, shackles, boulders, tools, nuts, bolts, logs and any article that cannot be sheared by the system of the present invention. The solid debris can be stockpiled or fragmented into finer particles by a pulverizing system. The pulverizing machine is any apparatus that can fragment or breakdown such large debris into a processable waste size. The fragmented debris can then be processed by the system of the present invention.

In a yet further embodiment, the method further comprises the step of (e) further separating the slurrified processable waste of (d) into at least two fractions, a first fraction being coarse fractions and a second fraction being fine fractions. This separation is accomplished using a second separation system comprising at least one separation device.

In another embodiment, the method further comprise the step of (f) further mixing the mixture of (e) using a second mixing tank system having at least one mixing tank with an agitation system. In still another embodiment, the mixture of steps (f) can be further sheared and slurrified.

In a further embodiment, the further mixing of step (f) is performed prior to the further separation of step (e).

In yet another embodiment, the processed fine fraction mixture of the present invention can be injected into a wellbore such as a non-productive reservoir.

In one embodiment, the system of the present invention also includes providing a plurality of conduits for connecting the first mixing tank systems, the first separation system, and the slurry tank system. In still another embodiment, the method of the present invention further comprises the steps of pumping waste through the system using a pump system and retaining the processed waste in at least one holding tank. In a further embodiment, the pump system comprises a plurality of injection pumps and centrifugal pumps. The method further comprises the step of disposing of the processed waste product.

In still yet a further embodiment, the present invention relates to a method of processing waste comprising the steps of: (a) mixing waste and a certain liquid, (b) separating the mixture into at least two portions, a first portion being solid debris and a second portion being of processable waste, (c) shearing and slurrifying the processable waste, (d) further separating mixture of step (c) into at least two fractions, a first fraction being coarse fractions and a second fraction being fine fractions, and (e) further mixing slurrified fine fractions of step (d). In yet still another embodiment, the processed mixture of step (e) can be injected into a wellbore. In one embodiment, the mixing is performed using at least one mixing tank system with agitation system. In another embodiment, the separation is performed using at least one separation system having at least one separation device. In a further embodiment, the shearing of the mixture is performed using a shearing system of the slurry tank system, wherein the shearing system is situated with the tank and comprises a gear box, at least one motor, at least one blade, at least one shearing mixer, and gun lines. The slurrifying can be performed using the slurry tank system.

BRIEF DESCRIPTION OF THE DRAWINGS

A more complete appreciation of the present invention and many of the attendant advantages thereof will be readily understood by reference to the foregoing description where considered in connection with the accompanying drawing in which.

DETAILED DESCRIPTION OF THE INVENTION

Figure 1:
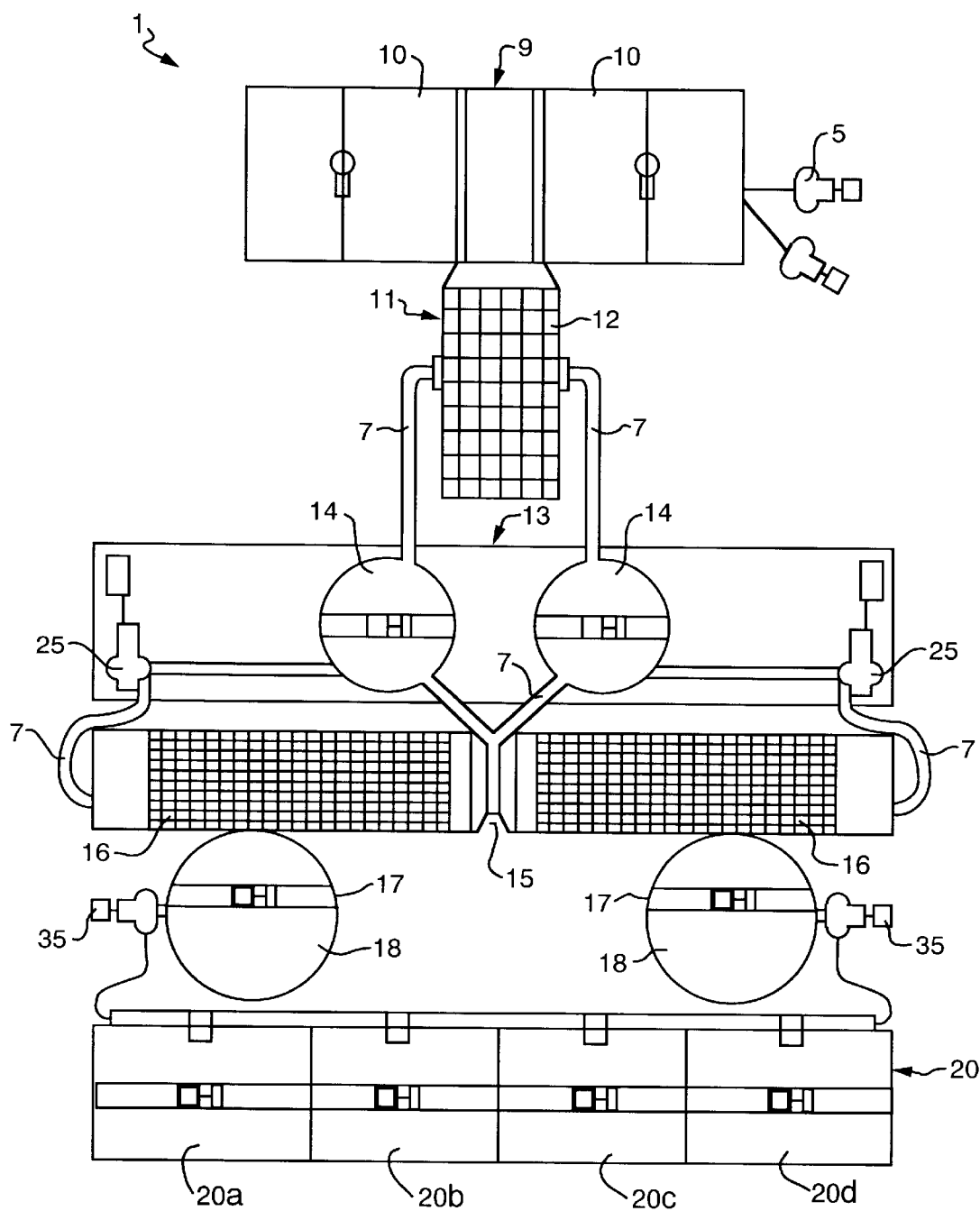
FIG. 1 is an overhead view of the waste disposal system of the present invention.

Referring now to the drawings wherein like reference numbers designate identical or corresponding parts throughout the several views, and particularly, the FIG. 1 wherein the waste processing system in accordance with the present invention, generally designated 1, comprises a first mixing tank system 9 having at least one mixing tank 10. Each of the mixing tanks 10 have an agitation system situated within the tanks. The agitation system of the present invention both mixes and shears. The agitation system of the present invention includes shearing devices and shearing systems. The agitation system comprises at least one motor, a gear box and a plurality of blades. The motor can be a Blue Chip Motor manufactured by Marathon. The first separation tank may also have a grading situated across the top of the tanks. The size of the mixing tank 10 is dependent upon how fast the operator wants to process the waste and the size and type of particles of waste being processed. At least one modified centrifugal pump 5 is attached to the first mixing tank system 9. The modified centrifugal pump is modified by increasing the spacing between the holder and impeller of a centrifugal pump. The centrifugal pump may be a Magnum 250 Pump which is manufactured by Harrisburg, Inc. There are jet lines and re-circulation lines attached to the first mixing tank system 9.

A first separation system 11 comprising at least one separation device 12 is attached to the first mixing tank system 9. The separation device 12 can be any vibrating screen such as shale shaker. The separation device may be a Scalping Shaker manufactured by Fluid Systems Corp. A manifold can be attached to the first separation device to control the speed and flow of the waste processing system 1.

A slurry tank system 13 is connected to the first separation system 11. The slurry is tank system 13 comprises at least one slurry tank 14 having a shearing system situated within each tank 14. The shearing system comprises a gear box, at least one motor, a plurality of blades, a shearing mixer and gun lines. The motor may also be a Blue Chip Motor manufactured by Marathon. The shearing Mixer may be a Rotostat mixer manufactured by Admix. The gun lines may be Mud Guns manufactured by Harrisburg. At least one shearing pump 25 is attached to the slurry tank system 13. The slurry tank system 13 has a plurality of outlets whereby re-circulation lines and conduits can be attached. A manifold system is also attached to the slurry tank system 13.

A second separation system 15 comprising at least one separation device 16 is attached to the slurry tank system 13. The separation device 16 in the second separation system is similar to the separation device in the first separation system 11.

A second mixing tank system 17 comprising at least one mixing tank 18 is attached to the second separation system 15. The size of the mixing tank 18 is contingent upon the size and type of particles of waste being processed. The second mixing tank system 17 has an agitation system situated with the mixing tanks 18. The agitation system is similar to the agitation system of the first mixing tank system 9. A centrifugal pump 35 is attached to the second mixing tank system 17 and a manifold system is attached to the centrifugal pump 35.

A holding tank 20 is attached to the second mixing tank system 17. The first mixing system 9, the first separation system 11, the slurry tank system 13, the second separation system 15, the second tank system 17 and the holding tank 20 are connected by conduits 7. The re-circulation lines and conduits 7 can be connected to any of the tanks using the manifold system. The holding tank 20 may have a plurality of compartments 20a–20d respectively and each compartment may have gauges to measure the amount of solids that are injected into the well. The holding tank 20 can also have a manifold system. At least one of the compartments can retain water to control the pressure within the compartments 20a–d. The waste processing system 1 can have a motor control room or a (SCR) service control room wherein control boxes, power sources, etc. are stored.

Figure 2:
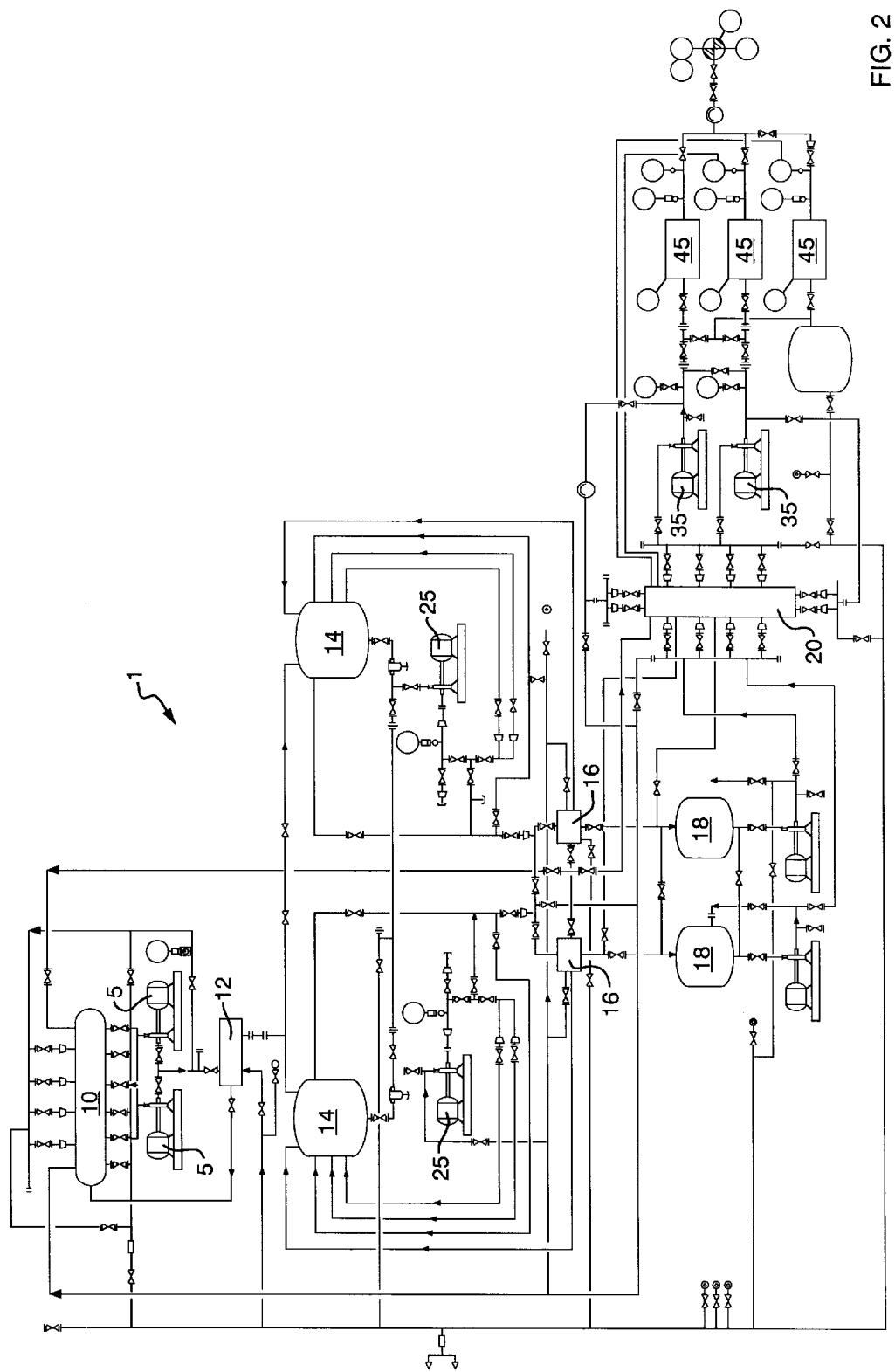
FIG. 2 is a flow diagram of the waste disposal system and the related method of processing waste.

Referring now to FIG. 2, the waste material is fed to the first 250 bbl mix tank 10 by a conveyor belt or by a pump 5. The main objective of this tank 10 is to fragment the clumps of clay pit solids and mix the solids with water. The tank 10 has two agitators within the tank and at least two centrifugal pumps 5. As the agitators rotated, the clumps of clay solids were battered by the paddles and broken up into smaller solids. The centrifugal pumps 5 are multifunctional. First, the pump sucks the solids from a bottom manifold and the solids are then pumped to the first stage separation device 12. To relieve the amount of flow, a circulating or manifold system was installed outside the tank 10. The circulation or manifold system functions to mix the solids in the 250 bbl tank 10. Second, the pump 5 is used as a back up pump and to assist in the mixing process within the tank. Third, the pump 5 may also function as a circulation pump. After the material is pumped over the first stage separation device 12, the device 12 equipped with large mesh screens functions to separate any large debris and unwanted metals out of the slurry mix before allowing the processable waste to enter into the slurry tanks 14. The debris is collected into an area to be disposed of in another manner or can be further processed.

The processable waste is then drained into the slurry tanks 14 at a controlled rate. The slurry tank system 13 has valves to control the amount of flow or the direction of processed waste. Each slurry tank 14 is equipped with a centrifugal pump 25 with a manifold system. The pump 25 has carbon tip blades which assists in the life extension of the blades. The high energy mixing and the grinding action of the slurry unit 14 causes the slurry material to be sheared and therefore reduced in particle size.

From the slurry tanks 14, the slurry is pumped over a second stage separation device 16 where the slurry passes over another set of screens that are sized accordingly to the well specification. The screens catch and separate any coarse fractions that escaped the grinding action from the slurry tank 14. The coarse fraction can be stockpiled or re-circulate through the waste processing system 1 of the present invention.

The fine fractions that passes through the second stage separation device 16 are then fed into the 150 bbl mixing tank 18 which are equipped with agitators and centrifugal pumps 35. The second mixing tank 18 is used to regulate the control of all the slurry that will be injected into a wellbore. The second mix tank 18 also has a manifold system that enables us to feed the pumps 35 or re-circulate mud to any stage of the waste processing system 1. The manifold can be use to re-circulate the waste product to the 250 bbl mix tank 10.

The processed slurrified fine particles are sent to the 400 bbl holding tank. The holding tank 20 is set up with four compartments 20a–d, each compartment being at 100 bbls. The holding tank 20 is set up with a suction manifold that is valved at each compartment. It is also manifolded to discharge into each compartment or back into the receiving line. The compartments of the holding tank 20 has an agitation system. The agitation system comprises a gear box, a motor and a plurality of blades. The 400 bbl holding tank 20 has at least two centrifugal pumps 35 that feed injection pumps 45 that are used for injecting the slurry into the wellbore.

Obviously, numerous modifications and variations of the present invention are possible in light of the above teachings. It is therefore to be understood that with the scope of the claims appended hereto, the invention may be practical otherwise then as specifically disclosed herein.

What is claimed is:

1. A system for processing drilling waste comprising:
   a) a first mixing tank system comprising at least one mixing tank having an agitation system situated therein;

b) a first separation system coupled to an output of the first mixing tank system, the first separation system comprising at least one separation device;

c) a first slurry tank system coupled to an output of the first separation system, the first slurry tank system comprising at least one slurry tank having a shearing system situated within said slurry tank;

d) a second separation system coupled to an output of the first slurry tank system, the second separation system comprising at least one separation device;

e) a second mixing tank system coupled to an output of the second separation system, said second mixing tank system having at least one mixing tank with an agitation system situated therein;

f) a manifold coupled to an output of the second mixing tank system and an input of the first mixing an system, wherein the manifold recirculates drilling waste product from the second mixing tank system to the first mixing tank system;

g) a holding tank system coupled to an output of the second mixing tank system; and h) an injection pump coupled to an output of the holding tank system for injecting waste product from the holding tank system into a wellbore.

2. The waste processing system of claim 1 further comprising a plurality of conduits for connecting said mixing tank, said first separation system, said slurry tank system and said second separation system.

3. The waste processing system of claim 1 further comprising a pump system for pumping waste through said waste processing system, said pump system being capable of pumping a carrier liquid through said waste processing system, said pump system comprising a plurality of injection and centrifugal pumps.

4. The waste processing system of claim 1, wherein said agitation system of said first mixing tank system comprises a gear box, at least one motor, and a plurality of blades.

5. The waste processing system of claim 1, further comprising a second slurry tank system connected to an input of said second separation system, said second slurry tank system comprising at least one slurry tank having a shearing system situated therein.

6. The waste processing system of claim 1, wherein each of said first and second separation systems comprise at least one screen.

7. The waste processing system of claim 6, wherein said first and second separation systems each comprise a plurality of screens having varying screen mesh sizes.

8. The waste processing system of claim 1, wherein said second mixing tank system comprises at least one mixing tank having a sampling system for testing processed waste.

9. The waste processing system of claim 1, wherein said shearing system of said first slurry tank system comprises a gear box, at least one motor, a plurality of blades, a shearing mixer and gun lines.

10. The waste processing system of claim 1, wherein said first mixing tank system comprises a mixing pump and said first slurry tank system comprises a shearing pump.

11. A system for processing drilling waste comprising:

a) a first mixing tank system comprising at least one mixing tank having an agitation system situated therein;

b) a first separation system condensing at least one separation device, said first separation system being connected to said first mixing tank system;

c) at least one slurry tank system comprising at least two slurry tanks having a shearing system situated within each of said slurry tanks, said slurry tank system being connected to said first separation system;

d) a second separation system comprising at least two separation devices, said separation system being connected to said slurry tank system;

e) a second mixing tank system comprising at least two mixing tanks having a second agitation system situated within each of said mixing tanks, said second mixing tank system being connected to said second separation system;

f) a manifold coupled to an output of the second mixing tank system and an input of the first mixing tank system, wherein the manifold recirculates drilling waste product from the second mixing a system to the first mixing tank system;

g) a holding tank system coupled to an output of the second mixing tank system; and h) an injection pump coupled to an output of the holding tank systems for injecting waste product from the holding tank system into a wellbore.

12. The waste processing system of claim 11 further comprising a plurality of conduits for respectively connecting said first mixing tank system, said first separation system, said slurry tank system, said second separation system, and said second mixing tank system.

13. The waste processing system of claim 11 further comprising a pump system for pumping waste through said waste processing system.

14. The waste processing system of claim 13, wherein said pump system comprises at least one pump having impellers for shearing the waste.

15. The waste processing system of claim 13, wherein said pump system comprises a plurality of injection and centrifugal pumps.

16. The waste processing system of claim 13, wherein said pump system is capable of pumping a carrier liquid through said waste processing system.

17. The waste processing system of claim 11, wherein said shearing system of said slurry tank system comprises a gear box, a least one motor, a plurality of blades, shearing mixer and gun lines.

18. The waste processing system of claim 11, wherein each of said first and second agitation system of said first and second mixing tank system comprises a gear box, at least one motor, and a plurality of blades.

19. The waste processing system of claim 11, wherein each of said first and second mixing tank system comprises at least one mixing tank having a jet line.

20. The waste processing system of claim 11, wherein said second mixing tank system comprises at least one mixing tank having a sampling system for testing the waste.

21. The waste processing system of claim 11, wherein each of said first and second separation devices comprising at least one screen.

22. The waste processing system of claim 11, wherein said separation system comprises a plurality of screens having varying screen mesh sizes.

* * * * *